United States Patent [19]

Ramirez et al.

[11] 3,959,131
[45] May 25, 1976

[54] APPARATUS AND METHOD FOR REMOVING POLLUTANTS FROM WASTEWATER

[75] Inventors: Ernest R. Ramirez, Lemont; Dennis L. Johnson, Woodridge, both of Ill.

[73] Assignee: Swift & Company, Chicago, Ill.

[22] Filed: Oct. 17, 1974

[21] Appl. No.: 515,638

[52] U.S. Cl. .............................. 210/44; 204/149; 210/199; 210/221 P; 261/121 R
[51] Int. Cl.² ..................... B01D 12/00; B01F 3/04
[58] Field of Search ................ 204/149–151; 209/164, 166, 168; 210/42, 44, 47, 62, 192, 220, 221, 199; 261/121 R, 122, DIG. 75

[56] References Cited
UNITED STATES PATENTS

| | | | |
|---|---|---|---|
| 996,560 | 6/1911 | Bradley | 210/192 |
| 1,543,324 | 6/1925 | De Raeve | 210/44 X |
| 2,368,028 | 1/1945 | Kernot et al. | 210/44 |
| 3,147,217 | 9/1964 | Halton | 210/44 |
| 3,175,687 | 3/1965 | Jones | 210/44 X |
| 3,238,127 | 3/1966 | Sebba | 210/44 |
| 3,479,281 | 11/1969 | Kikindai et al. | 210/44 |
| 3,525,437 | 8/1970 | Kaeding et al. | 210/44 X |
| 3,542,675 | 11/1970 | Mail et al. | 210/221 P X |
| 3,642,617 | 2/1972 | Brink et al. | 210/44 |
| 3,726,780 | 4/1973 | Harnden et al. | 210/44 X |
| 3,816,274 | 6/1974 | Anderson | 210/44 X |
| 3,816,276 | 6/1974 | Ichiki et al. | 210/44 X |
| 3,822,204 | 7/1974 | Sako et al. | 210/44 |

*Primary Examiner*—Charles N. Hart
*Assistant Examiner*—Robert H. Spitzer
*Attorney, Agent, or Firm*—Edward T. McCabe; Charles E. Bouton; Raymond M. Mehler

[57] ABSTRACT

A flow of polluted raw wastewater may first be treated with a coagulant, then it is rapidly mixed with very fine bubbles supplied beneath the wastewater flow and may then be treated with a flocculant, after which the pollutants are separated from the water by skimming off the surface of the wastewater.

33 Claims, 13 Drawing Figures

APPARATUS AND METHOD FOR REMOVING POLLUTANTS FROM WASTEWATER

This invention relates to a method and an apparatus for removing pollutants from raw wastewaters and more specifically involves an improved method and apparatus wherein very fine bubbles are provided below flowing wastewater, which bubbles are rapidly mixed with and attached to pollutants within the wastewater.

In various fields of industry, processes are practiced in which there are generated raw wastewaters containing particles such as suspended oils, fats, proteins, fillers, glycerides, fibers, and biodegradable materials, and emulsified fats, oils, and the like. Various pollution problems are brought about when such suspended and emulsified particles are permitted to enter natural bodies of water or to enter into sewage treatment systems and the like. In order to lessen such pollution problems, raw wastewaters are processed in a variety of manners.

Prior art techniques indicate that a relative degree of success in purifying such wastewaters can be achieved by passing bubbles of gases such as hydrogen, oxygen or air through a large tank containing industrial wastewater, whereby rising gas bubbles occlude or become attached to some of the particulate matter. The thus treated particles tend to be less dense than water and accordingly rise to near the surface of the liquid within the tank where they can be skimmed off. Often these processes are combined with chemical treatments. Even then, such prior art techniques are time consuming and relatively inefficient. Generally, a prior art apparatus cannot economically treat wastewater as quickly as it is generated in a large scale industrial process so as to satisfactorily remove pollutants therein.

As described in co-pending U.S. Pat. application, Ser. No. 441,673, improved results can be obtained by first forming an embryo floc, hereinafter defined, which may then be treated with a polyelectrolyte to form a full floc, hereinafter defined, that is then separated from the wastewater. It has now been determined that even further improved results--from the point of view of speed, efficiency, energy conservation, size of apparatus, and amount of raw materials utilized--can be obtained with the present method and apparatus hereinafter disclosed, the most significant improvement being that the embryo floc is formed by bubbles entering a wastewater from below same.

It is therefore an object of the present invention to provide an improved method and means for supplying large quantities of gas bubbles in relatively small enclosed areas that are positioned below and in communication with a tank through which raw wastewater flows.

Another object is to provide an improved method and means for producing a superior embryo floc through the efficient formation of very small bubbles which rise into a rapidly flowing wastewater.

The present invention comprises a means through which raw wastewaters may flow and includes an improved, relatively compact bubble supply cell for the production of a dense zone of bubbles. This cell is in communication with and below a tank through which the wastewater rapidly flows, whereby the bubbles combine with impurities in the wastewater for the formation of aggregates of bubbles and pollutants. Downstream of the tank is a separation means permitting the aggregates to float to near the surface of the wastewater for the separation thereof. The present improved process includes the introduction of a dense zone of bubbles into rapidly flowing wastewater from below the flow of wastewater to form aggregates of bubbles and, wastewater pollutants. The wastewater pollutants treated by the present method then flow into a basin where they float to the surface of the wastewater and are separated therefrom.

Additional objects, if not set forth specifically herein, will be readily apparent to those skilled in the art from the detailed description of the invention which follows and from the drawings in which:

The essential steps of the present method briefly include the flowing of an industrial or municipal wastewater through a compact and dense zone of fine bubbles that originate from a bubble supply that is positioned below the zone such that substantially all of the wastewater and of the pollutants therein remain above the bubble supply at all times. Within this zone, the fine bubbles are rapidly contacted with the pollutants to form aggregates of bubbles and pollutants. Thereafter, the aggregates and wastewater flow into a flotation basin wherein the aggregates rise to the surface of the wastewater and are separated therefrom.

Figure 1:
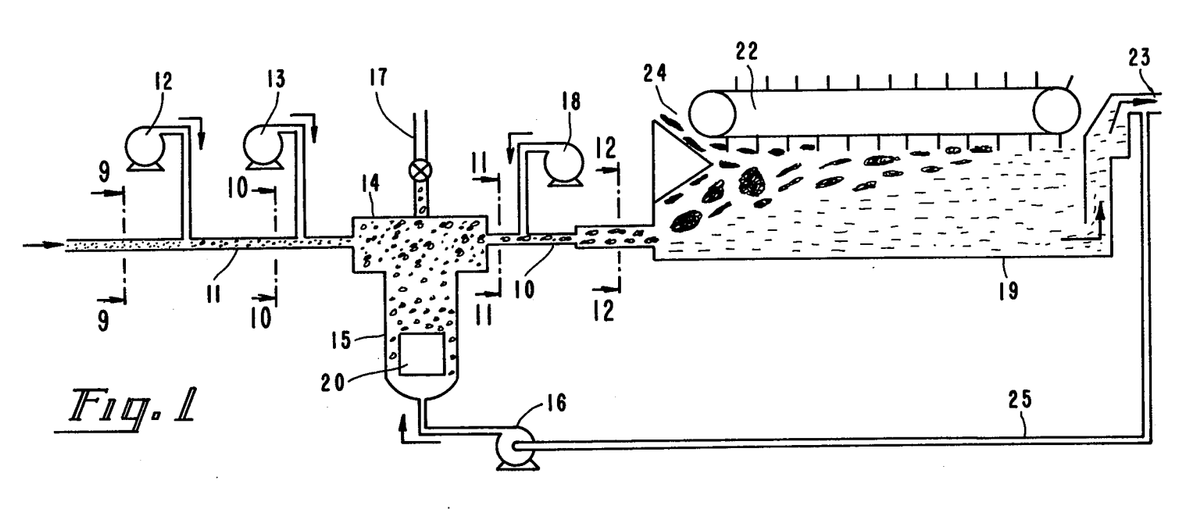
FIG. 1 is a schematic illustration of the preferred apparatus.
Figure 9:
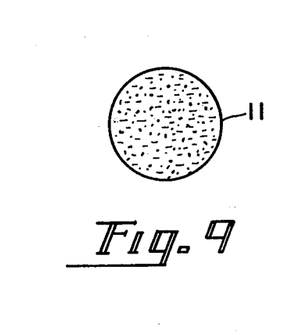
FIG. 9 is a schematic illustration of the raw wastewater flowing past line 9—9 of FIG. 1.
Figure 10:
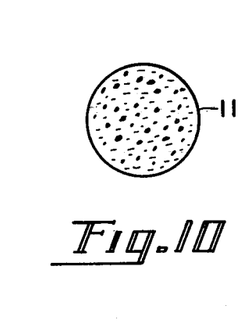
FIG. 10 is a schematic illustration of the treated wastewater flowing past line 10—10 of FIG. 1.

As an optional feature of the method of the present invention, industrial or municipal raw wastewaters are first pretreated before they enter this zone with one or more coagulants, such as aluminum sulfate, alum, ferric sulfate, ferric chloride, lime, and the like, which assist in breaking down emulsions within the wastewater and agglomerating some of the pollutants within the wastewater. This preferred step is not essential to the basic principles of the present invention, since various raw wastewaters will require no additional coagulation, although this step will generally increase the overall effectiveness of the present process. FIG. 1 illustrates this step of adding a coagulant as a pretreatment, and FIG. 9 depicts the consistency of a typical raw wastewater flowing into influx conduit 11. Impurities and pollutants are illustrated by a large number of relatively small dots to depict that the raw wastewater can contain approximately $10^8$ to $10^9$ pollutant particles per liter of wastewater. FIG. 10 illustrates the impurities as having a somewhat larger size, after this optional treatment with a coagulant. The approximate pollutant aggregates or particles one minute after coagulant introduction is reduced by roughly a factor of 10, to about $10^7$ to $10^8$ per liter, due primarily to the fact that such aggregates or particles are combined with each other through the action of the coagulant.

As a further optional step, a compound that will suitably adjust the pH of the raw wastewater can also be added at about the same time that the coagulant is added. Such pH adjusting compounds are exemplified by calcium hydroxide, or any other compound that will result in the pH of the finally clarified wastewater being within the range of about 6 to 9, preferably 6 to 8. The purpose of the pH adjuster is to return the pH of the wastewater to levels that meet water discharge requirements of municipalities or other governmental units. The compound may either raise or lower the pH, depending upon the wastewater being treated and any compounds added thereto. For example, most coagulants are acidic, and the addition thereof may require the addition of a compound such as calcium hydroxide to raise the pH.

Figure 2:
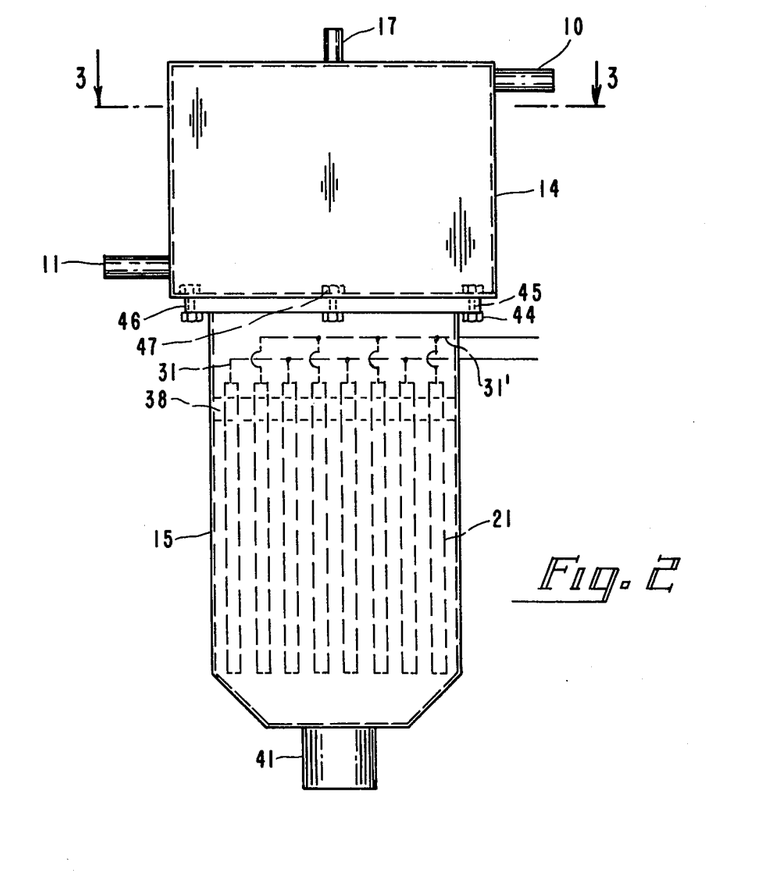
FIG. 2 is an elevation view of the preferred embodiment of a portion of the apparatus of FIG. 1.
Figure 3:
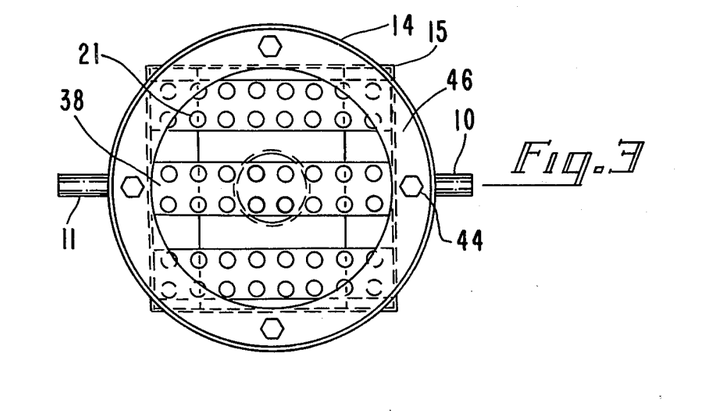
FIG. 3 is a plan view of the embodiment of FIG. 2 with parts removed.

After either or both of these optional steps, the first of the essential method steps takes place. The wastewater is treated by flowing same through a tank containing a relatively compact and especially dense zone of very fine bubbles originating from a bubble supply cell below said zone. The bubbles themselves may be produced electrolytically or may be introduced into the cell from a source of gas bubbles dispersed or dissolved in a fluid. The wastewater flow is generally horizontal and relatively rapid, while the bubbles initially contact the wastewater flow with a substantially vertical orientation due to their rise from said cell to form the dense zone; and when the wastewater flow meets this dense bubble zone within the relatively small volume of the tank, a moderately turbulent condition is created which increases the amount of direct contact between the bubbles and the pollutants within the wastewater but is not so vigorous as to break up the aggregates of bubbles and pollutants or the embryo floc thus formed. The generally spiral-type upward movement of the wastewater achieved in the embodiment depicted by FIG. 2 and 3 is a specific example of the type of moderate turbulent condition that is created within the tank. However, very satisfactory results are also obtained in tanks having general configurations more along the lines of those shown in the various alternate embodiments, the moderate turbulent condition created in such devices being of a more random nature whereby the bubbles and the wastewater flow rapidly churn to form the aggregates or the embryo floc.

Figure 11:
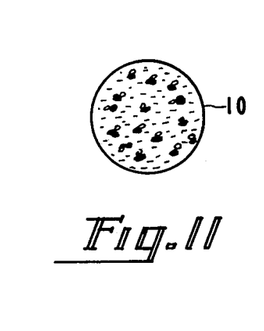
FIG. 11 is a schematic illustration of the aggregates of bubbles and pollutants or the embryo floc flowing past line 11—11 of FIG. 1.

The wastewater treated after this step is depicted in FIG. 11. That figure is a representation of the aggregates of bubbles and pollutants, which are designated herein as the "embryo floc" when further subsequent flocculation thereof is needed to form a full floc. As utilized throughout herein, an embryo floc is that floc formed by the interaction among coagulant (if used), solid and liquid colloidal pollutants, and fine bubbles, which formation occurs primarily within the tank. An embryo floc, while preferably including a coagulant, need not of necessity include same, depending upon the particular wastewater being treated. The embry floc generally consists of roughly $10^5$ to $10^6$ aggregates of bubbles and pollutants per liter of treated wastewater. The term "aggregates of bubbles and pollutants" is used herein as generic to both such embryo floc and the full floc described hereinafter and can be thought of as an embryo floc that is not subsequently treated with a flocculant.

This step whereby the aggregates or the embryo floc is formed is accomplished over a period of from about six seconds to about two minutes, preferably one minute or less, during which time impurities from the wastewater become attached to one or more of the very fine bubbles. This formation of the embryo floc is accomplished very rapidly. The wastewater flows through the system at rate of about N liters per minute and the volume the tank is within the approximate range of about 1/10 N to 2 N liters; thus, the wastewater remains within the tank and hence is direct contact with the zone of very fine bubbles for from approximately 1/10 minute to 2 minutes. Although this is a very short period of time, an exceptionally large number of aggregates of bubbles and pollutants are nevertheless formed to develop a superior embyro floc due to the exceptionally high quantity of bubbles ($10^4$ to $10^{10}$ bubbles per liter of wastewater, small bubbles size (10 to 500 microns, preferably 20 to 300 microns, in diameter), and the moderate turbulence created within the tank.

Figure 13:
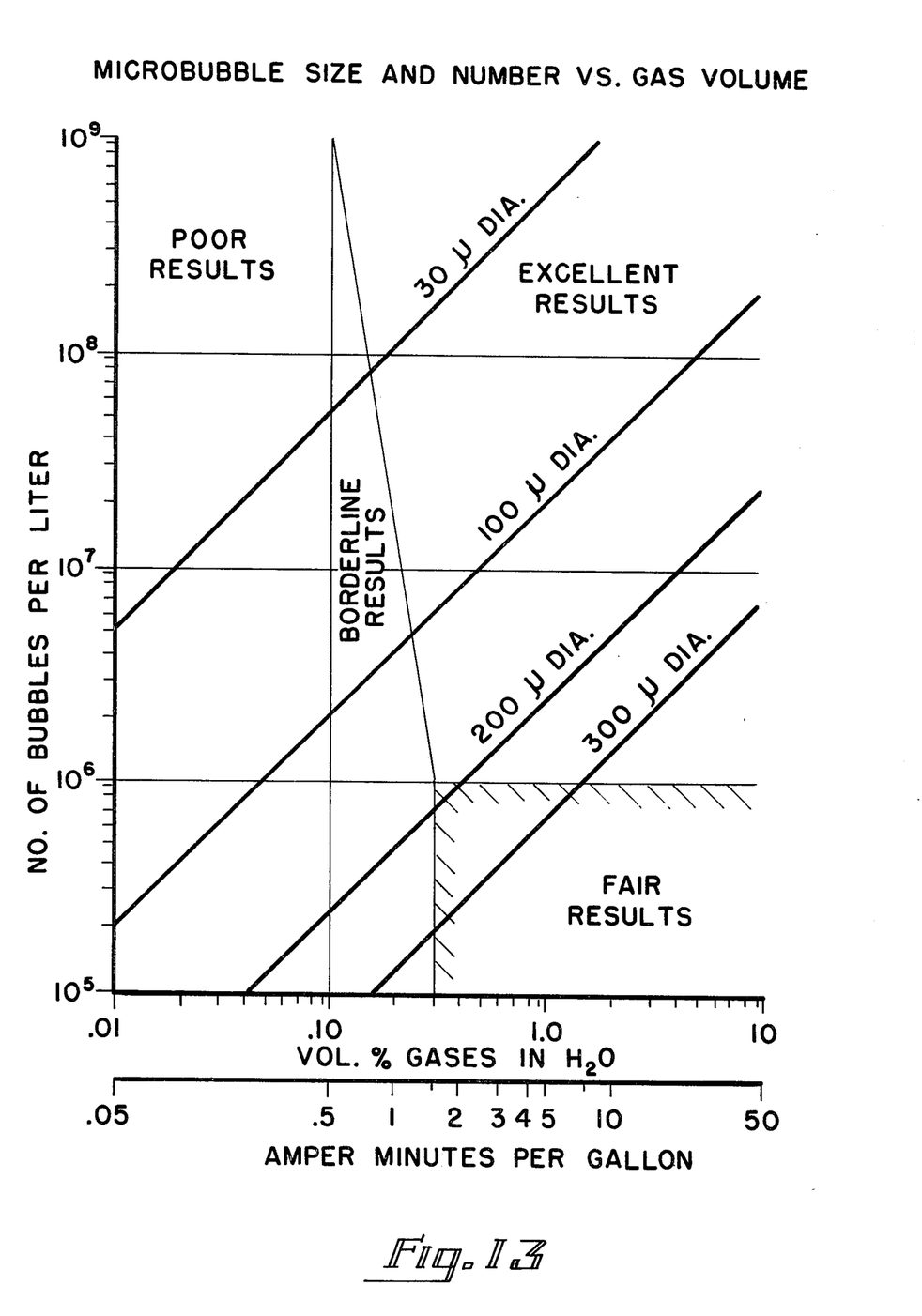
FIG. 13 is a graphical representation of the relationships between the size and number of the bubbles and a volume percent of the gas bubbles.

In order to illustrate some relationships of various parameters of bubbles produced in accordance with the present invention, FIG. 13 plots experimental data accmulated for one particular type of wastewater which was treated by electrolytically produced bubbles in a test tube environment approximating that of the preferred apparatus and method. Such wastewater was a tannery wastewater having approximately 1,300 mg/l BOD (biochemical oxygen demand) and 456 mg/l hexane extractables. From FIG. 13, it can be seen that satisfactory-to-excellent results can be obtained for this tannery wastewater if from 0.5 to 50 ampere minutes per gallon of wastewater are supplied by the electrodes. From an economic viewpoint, greater than 10 ampere minutes per gallon tends to be unnecessary. The preferred range has been found to be on the order of 1.5 to 8 ampere minutes per gallon of tannery wastewater.

When currents within these ranges are supplied, there are produced in the tannery wastewater volume percents of electrolytically produced gas bubbles in the bubble supply cell of from about 0.1 percent to 10 percent. Excellent results are found to be obtained if from about 0.3 to 10 volume percent of electrolytic gases are present. A most economic range has been found to be about 0.3 to 2 volume percent.

The relationship between the volume percent of gases within the bubble supply cell and the actual number of bubbles per liter produced within the cell depends, of course, upon the size of the bubbles. For example, excellent results can still be obtained with an average bubble diameter of about 300 microns, there being produced on the order of $10^6$ bubbles per liter. However, in order to achieve these excellent results, the relatively high amount of ampere minutes per gallon, and hence relatively high volume percent of gases, are required when the average bubble diameter is this large. But, as can be seen from FIG. 13, when the average bubble diameter is decreased to on the order of 30 microns, substantially more bubbles are produced with a flow of the same current and indeed excellent results can still be achieved with a current flow significantly less than is needed when bubbles generated are of a much larger diameter.

It is to be noted that all of the bubble and current parameters depicted on FIG. 13 are well within the scope of the present invention when it is utilized with this particular tannery wastewater. Specific bubble and current parameters will vary with different wastewaters. FIG. 13 does illustrate the general proposition that significant advantages are obtained when bubble sizes are reduced.

In an optional step of the present method, the bubble size is kept especially small and of particularly consistent size. The step is essentially the flowing of a surfactant into the bubble supply cell, preferably near the bottom thereof, which results in the formation of bubbles that are kept consistently within the range of about 10 to 100 microns in diameter and generally kept within the very narrow range and exceptionally small diameter size of about 30 to 50 microns. Generally, excellent results are achieved since the smaller and more numerous bubbles are more easily captured by the wastewater pollutants. One reason for this effect is that the rate at which bubbles rise in a liquid is a function of their size, with smaller bubbles rising more slowly. The slower the bubbles rise, the longer they remain in the tank, thereby increasing the chance that they will contact a wastewater particle, so as to increase the speed and improve the efficiency of formation of the aggregates of bubbles and pollutants or the embryo floc as is generally depicted in FIG. 11.

Almost any surfactant may be utilized in this optional step including those of the non-ionic, anionic, or cationic variety, such as nonylphenylpolyethylene glycol ether (nonionic), alkylphenyloxidepolyethanol (nonionic), sodium alkyl aryl sulfonate (anionic), dodecylbenzene ammonium chloride (cationic), tetradecylbenzene ammonium chloride (cationic), hexadecylbenzene ammonium chloride (cationic), or alkyldimethyl aminoxide (cationic).

The amount of surfactant added to the bubble supply cell is maintained within the approximate range of 0.0001 to 0.1 percent by weight of the aqueous phase within the cell. By this step, it has been determined that the surface tension of the aqueous phase within the cell is reduced to values between about 20 to 40 dynes per square centimeter. This low surface tension significantly assists in the generation of bubbles consistently kept within the range of 10 to 100 microns, preferably 30 to 50 microns, as an average diameter. If a surfactant is not present, such surface tension is on the order of about 72 dynes per square centimeter.

The optional surfactant addition step has particular significance in that same is not added to a large volume of wastewater. Having to add the surfactant to a large volume would be very costly, would itself add a further pollutant, and would make more difficult the ultimate removal of pollutants. Instead of adding surfactant to a large tank of wastewater, for example, such as to the flotation basin of the present apparatus, surfactant in accordance with this optional step need be supplied for distribution only the relatively small volume of the bubble supply cell.

Another optional step of the present method may be included when the bubbles are produced electrolytically. It consists of the introduction of an aqueous source of ionic species into the cell, preferably near the bottom thereof. This generally has the effect of aiding in the current generated between the electrodes. In other words, it increases the ampere minutes per gallon that can be generated by the electrodes within the cell without varying the voltage. This aqueous source of ionic species includes water, which may contain acids, bases, or salts. This step is especially useful in processing industrial wastewaters that have relatively low electrolytic conductivity. If these ionic species include ions such as chloride ions, the additional feature of providing a disinfecting agent is achieved when such chloride ions liberate chlorine. Exemplary of suitable ionic species are compounds such as sodium chloride, sulfuric acid, sodium bromide, sodium iodide, sodium sulfate, ferric sulfate, alum, and calcium hydroxide. The concentration of such ionic species (anions and cations) within the bubble supply cell should be kept within a range of about 0.005 Normal to 0.05 Normal.

Figure 12:
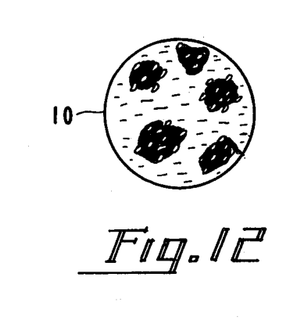
FIG. 12 is a schematic illustration of the wastewater and full floc flowing past line 12—12 of FIG. 1.

As a further optional step between the essential step of forming aggregates (by rapidly contacting a flowing wastewater with a dense zone of bubbles introduced below the wastewater flow) and the essential step of flowing to a flotation basin, a flocculant is added to the flow. A flocculant such as a polyelectrolyte is added to the embryo floc in concentrations of about ½ to 15 ppm, preferably ½ to 6 ppm, thereby assisting in the formation of the full floc. FIG. 12 depicts this full floc, which is in essence the embryo floc treated with a flocculant. Such full floc includes conglomerates of impurities, the coagulant (if any), the flocculant, and a relatively large number of fine bubbles. The full floc has a relatively compact structure and has a low apparent density (usually within the approximate range of about 0.7 to 0.9) and thus has substantial buoyancy in water.

This optional step whereby flocculant is added can be omitted when a particularly well developed embryo floc, designated herein as aggregates of bubbles and pollutants, is formed in a particular wastewater. If such is the case, there is no need to form a full floc since such aggregates exhibit substantially the same physical attributes as does the full floc. This step is accomplished by flocculant being added to the flow of the embryo floc, thereby achieving a mild mixing and a formation of the full floc. While the present process is not restricted to the use of a particular flocculant, it has been found that polyelectrolytes produce outstanding results. Such include polyacrylic acrylamides, copolymers of from about 50 to 90 weight percent acrylamides or methacrylamides, and from about 10 to 50 weight percent acrylic or methacrylic acid or water soluble salts thereof. These polymers are characterized by weight average molecular weight of about 2 million and usually with the range of about 7 to 12 million as measured by light scattering techniques. Such polymers are known in the art and are available from several commercial sources.

Proceeding with a detailed discussion of the next essential step of the present method, the full floc or the aggregates of bubbles and pollutants, along with the aqueous phase of the wastewater that has now been substantially clarified, flow into a large enclosed area such as a flotation basin. Since the density of the full floc or of the aggregates is significantly less than that of water, the full floc or the aggregates quickly rise to the surface of the clarified water within the flotation basin. The full floc or aggregates are then simply allowed to float to near the top surface of the contents of the flotation basin, whereupon such top surface is skimmed off and kept separated from the clarified water which itself flows from the basin through an efflux conduit. Preferably, the efflux of the clarified water is accomplished toward the bottom of the basin. It is preferred that the skimming off be in a direction substantially opposite to that of the general direction of the flow of the clarified water, so as to reduce the chance of any of the full floc or aggregates flowing through the efflux means for the clarified water.

A further, optional step of the present method which may be utilized in addition to the essential separating step previously described, gas bubbles, such as those of air, hydrogen, or oxygen, may be introduced into the flotation basin near its bottom and permitted to bubble therethrough in order to assist in the rising of the full floc or the aggregates. Such additional step is not an essential method step. As a further refinement, the quantity of bubbles introduced can be greatest at that portion of the basin where the treated wastewater enters the basin, said bubble quantity becoming gradually less and less downstream of such point of entry.

As a further additional optional step, some of the clarified water flowing through the efflux conduit within the flotation basin may be directed to the bubble supply cell for the purpose of replenishing the water supply needed to continue the supplying of gas bubbles there within.

In the preferred embodiment of the apparatus illustrated in FIG. 1, an industrial or municipal raw wastewater flows into the apparatus through influx conduit 11. The dimensions of the conduit 11 are such as to accommodate a flow of approximately N liters per minute of raw wastewater. Along conduit 11 may be provided optional coagulant injector 12 and or optional further injector 13 for adding a compound to adjust the pH of the wastewater. If desired, either or both of the injectors 12 and 13 can be omitted. As previously discussed, whether or not it would be helpful to add a coagulant or a compound to adjust pH would depend upon the particular impurities that are present within the raw wastewater that is being treated. Such injectors 12 and 13, when included, contain fluid moving devices, such as metering pumps, capable of introducing a predetermined quantity of fluid into the present apparatus and also including a conduit member that connects the injector to the desired location within the apparatus.

Downstream of any such introducer 12 or 13 is a tank 14. Tank 14 may be of any size and shape, for example, having circular, square, or rectangular cross-sections. As previously mentioned, tank 14 has a volume on the order of 1/10 N to 2 N liters, preferably about N liters, to assist in achieving the desired rapid aggregate formation.

Located immediately below the tank member 14 is a cell 15. More than one such cell 15 may be provided, if desired. The top surface of the cell 15 is in communication with at least a portion of the bottom surface of tank 14. Located within the cell 15 is a bubble introduction means 20.

Bubble introduction means 20 is provided for supplying hydrogen, oxygen, or other gas bubbles within cell 15. The bubble introduction means 20 preferably includes electrodes, described in more detail hereinafter in connection with FIGS. 2, 3, 4 and 5 which are constructed of a conductive material such as a metal and are connected to a power source. When current flows between the electrodes, water within cell 15 is decomposed into hydrogen and oxygen gas bubbles. Although such an electrode arrangement is preferred, the bubble introduction means 20 may instead supply air bubbles or other gas bubbles, which bubbles are either dissolved in water (FIG. 6) by a means for pumping gas under pressure into water or are dispersed in water (FIG. 7) by a blender or a mixer, as hereinafter described.

An aqueous fluid injector 16 is not an essential feature of the present apparatus. When provided, it is in direct communication with the cell 15. The injector 16 can be utilized to introduce aqueous fluids into cell 15 in the form of any one or more of tap water, containing ionic species, or an aqueous system including a surfactant. The aqueous fluid injector 16, when provided, has a structure along the lines of injector 12 or 13, as hereinbefore described. If injector 16 is omitted, the aqueous fluid otherwise provided thereby is supplied from the wastewater itself, entering from the top of cell 15 through tank 14.

In communication with the top surface of the tank 14 is a gas escape tube 17, which may be included to vent gases or to relieve execessive gas pressure within the tank 14 by providing a conduit through which gases which have not been combined with particles in the tank 14 may escape.

Flocculant injector 18, when provided, is downstream of the tank 14 and in communication with a transfer conduit 10, which conduit permits treated wastewater to flow between the tank 14 and flotation basin 19, downstream therefrom. In the preferred embodiment, flotation basin 19 is rectangular in cross-section and includes a skimming means 22 well above and substantially parallel with the bottom surface of the basin 19. The flotation basin includes an efflux conduit 23 through which the water clarified by the present apparatus flows. Also provided is skimmings efflux conduit 24 through which the pollutants are moved for storage, safe disposal, or further treatment.

While many specific structural details can be varied within the scope of the present apparatus, a preferred embodiment of the cell 15 and tank 14 is shown in FIGS. 2 and 3. In this preferred embodiment, the bubble introduction means 20 inclues a plurality electrodes 21 that are positioned within cell 15. In FIG. 2, they are shown as being suspended within the tank 15 by a hanger member 38. Hanger member 38 must provide for the insulation of electrodes 21 from each other. An inexpensive and convenient material out of which member 38 may be constructed is wood. However, almost any other type of material is suitable, provided the electrodes are insulated from each other along member 38.

Each alternate electrode is connected to the power source by means of connecting member 31, which can take the form of one or more electrical wires. Each of the remaining alternate electrodes 21 are connected to another electrode connecting member 31' of similar construction, which is also connected to the power source.

Preferably, provision is made for polarity reversal so that the electrodes serving as cathodes can, when desired, be utilized as anodes, and vice versa. Polarity reversal can be accomplished manually by reversing the connections between connecting member 31 and connecting member 31' to the terminals of a DC power source or a rectified AC power source. This same result can be accomplished instead, for example, by utilizing a device such as a reversing switch. (Not shown).

Figure 4:
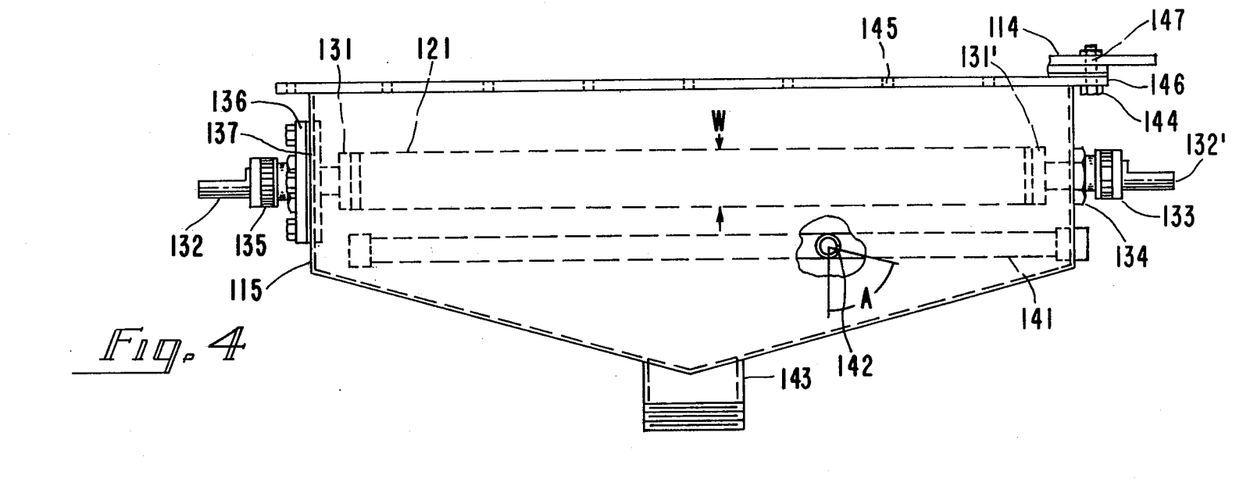
FIG. 4 is an elevation view of an alternative embodiment of the portion of the apparatus shown in FIG. 2 and 3.
Figure 5:
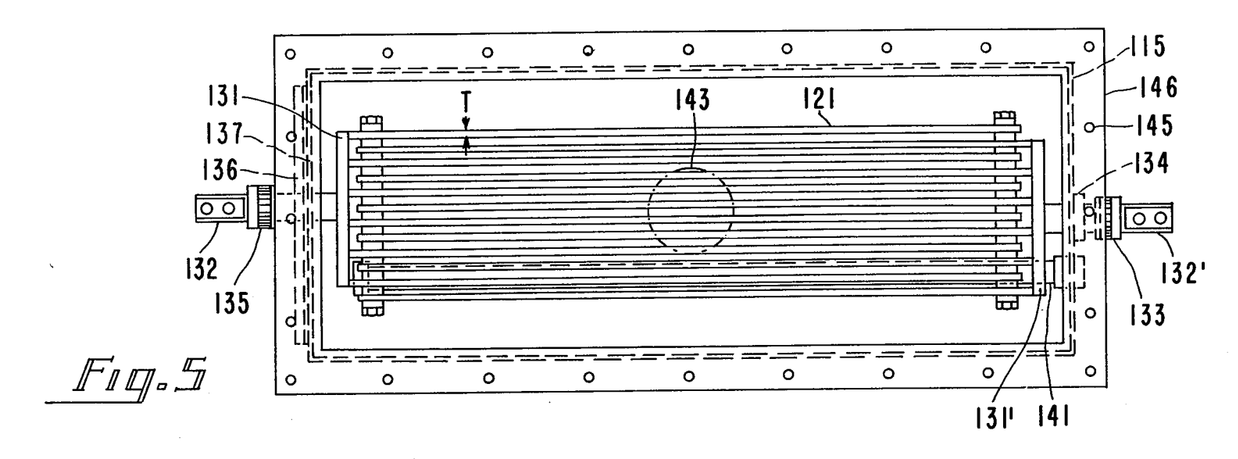
FIG. 5 is a plan view of the alternate embodiment of FIG. 4.

In FIG. 2, the electrodes 21 themselves are shown as hanging in a vertical direction. However, it is well within the scope of the present invention that such electrodes may be securely fastened such that they lie substantially horizontally (FIGS. 4 and 5). This latter alternative can even be more advantageous than the arrangement shown in FIG. 2, since the bubbles which are generated along the full length of the electrodes are less likely to come into contact with each other within the cell 15 when the electrodes are positioned in a horizontal orientation rather than a vertical orientation, with the result that the bubbles reach the tank 14 in a manner that has improved efficiency. The vertical orientation has the practical advantage of permitting a relatively simple and inexpensive means for suspending electrodes 21, particularly when the electrodes are made of a material that has only average conductivity and is relatively heavy, as is the case for Duriron electrodes which may be utilized in this embodiment.

It has been found that, in order to achieve on amperage adequate to supply bubbles of the proper size and density, if electrodes made of Duriron are utilized, a large number of relatively large electrodes must be provided. For example, in the preferred embodiment of this apparatus, there are provided about 70 electrodes that are rod-shaped and made of Duriron having a diameter of from about 1½ inches to 2 inches and a length of about 5 feet. Of course, the particular dimensions of the Duriron electrodes will vary depending upon the number of electrodes, the total current to be generated, the spacing between the electrodes, the voltage, and the conductivity of the water. The preferred embodiment also includes a fluid distribution conduit 41. This conduit can provide a variety of functions. It can be utilized to flush out impurities that may have inadvertently entered the cell 15. It may also be utilized as a means to introduce a variety of fluids into the cell 15, preferably near the bottom thereof. For example, tap water can be introduced therethrough by means of the aqueous fluid injector 16, which tap water can be provided for the purpose of being decomposed at electrodes 21. Together with or in place of supplying tap water, conduit 41 can be utilized to introduce ionic species into the cell 15 for the purpose of improving the conductivity of the system and hence increasing the efficiency of the decomposition process. And, in combination with or in lieu of the tap water and/or the ionic species, a surfactant may be introduced into the cell 15 through the conduit 41. If conduit 41 is not provided, the water that is decomposed by the electrodes 21 may be replenished from the flow of wastewater itself.

The entire top surface of the preferred cell 15 is in direct communication with the bottom surface of the tank 14. Cell 15 is secured to tank 14 by means of bolts 44 located through holes 45 in a flange 46 along the top periphery of cell 15, bolts 44 also passing through holes 47 in tank 14.

The tank 14 itself may be of any convenient shape. The preferred embodiment utilizes a tank 14 that is substantially the shape of a right cylinder, the horizontal cross-section thereof being the circular cross-section of the right cylinder. This arrangement can be best seen in FIG. 3. While this particular construction is by no means essential to the present invention, it has been found that the wastewater tends to flow around the circumference of a tank 14 having this particular construction, with the flow of bubbles from the cell 15 urging this wastewater flowing along such circumference to flow upward in a moderately turbulent, spiral-type fashion. This effect, while not essentially to the present invention, appears to aid in the preventing of large particulate matter from entering the cell 15 and also serves to provide a relatively long wastewater flow path within the tank 14, to thereby increase the probability that pollutants will come into contact with bubbles within the tank 14. A further feature of the preferred apparatus is the fact that the influx conduit 11 is positioned near the bottom surface of the tank 14 and the transfer conduit 10 is positioned near the top surface of tank 14. This arrangement assists in the formation of the upward spiral-type effect.

It is to be emphasized that adequate results are still obtained with tank 14 and cell 15 configurations different from those of the preferred embodiment described above. For example, as depicted in FIG. 1, the cell 15 may be of a right cylindrical configuration and the tank 14 may be of a rectangular box-shaped configuration with influx conduit 11 and transfer conduit 10 being positioned at approximately the same height along substantially opposite sides of the tank 14. Such an arrangement is suitable for producing the rapid mixing of bubbles and wastewater to achieve a type of churning action moderate turbulence.

The electrodes, when positioned vertically can be arranged in any convenient fashion, for example, by concentric circles or by rows of electrodes as depicted in FIG. 3. It is only essential that the arrangement be such as to provide enough free space within the cell so that the bubbles will readily pass up through the cell 15 and into the tank 14.

FIGS. 4 and 5 show an alternate embodiment of the bubble introduction means 20. A plurality of electrodes 121 are positioned within cell 115 in a substantially horizontal manner. They are in alternate communication with either of two electrode connecting members 131 and 131' so as to form two fork-shaped electrode units oriented in opposite directions, with electrodes from one fork-shaped electrode unit alternating with and being spaced between and substantially parallel to the electrodes from the other fork-shaped electrode unit. Each connecting member 131, 131' is attached to a terminal member 132, 132' which extends outside of the cell 115 for ultimate connection to the power source by cables or the like.

As can be best seen in FIG. 4, the particular construction shown for this alternate embodiment is such as to permit easy removal of the electrodes to facilitate replacement or repair thereof, while maintaining the watertight integrity of the cell 115. This particular construction is intended as only one manner by which the electrodes may be removed. The particular structure illustrated includes a threaded fastening means 133 having a bolt member 134, the fastening means 133 securing one of the terminal members 132' onto the cell 115. The other terminal member 132 is secured to the cell 115 by a threaded fastening means 135 having a bolt and bracket assembly 136. To remove the electrodes, threaded fastening means 136 and bolt member 134 are loosened, as is threaded fastening member 135. Bolt and bracket means 136 is removed and the entire electrode unit, including both of the two fork-shaped electrode units and terminal members 132, 132', is slid through opening 137 which is closed by bolt and bracket assembly 136 when the cell 115 is in operation.

This alternate embodiment preferably includes a fluid distribution conduit 141 positioned below the electrodes 121 within the cell 115. This conduit 141 is in communication with the aqueous fluid injector 16, (FIG. 1) for the purpose of introducing into the cell 115 any one or more of the aqueous fluids previously mentioned. Which of these, if any, are to be utilized will depend upon the materials already in the wastewater being treated. For example, an ionic species is added only if the particular electrode surface area, material, and spacing between electrodes are not adequate to generate the desired amount of current with the water within the cell 115. Similarly, a surfactant is added only if the particular electrode configuration and the water within the cell do not produce bubbles of the proper size. If surfactant is added into the cell of the present apparatus, it generally is economically feasible to do so, since the size of the cell into which the surfactant is to be added is a relatively small volume when compared with, for example, the volume of the flotation basin 19. While this feature applies for all embodiments, it is especially applicable to the alternate embodiment of FIGS. 4 and 5, since cell 115 usually contains highly conductive, closely spaced, and relatively small electrodes 121, which permits the cell 115 to be smaller in size than is generally possible with the other embodiments.

When desired, the aqueous liquids introduced into cell 115 through fluid distribution conduit 141 may be supplied by separate means and pumped into the cell by the aqueous fluid injector 16. An alternate feature of this invention is that such aqueous fluid or one of the aqueous fluids, if more than one is required, may actually be the clarified wastewater that flows from the efflux conduit 23. In communication with efflux conduit 23 can be a conduit 25 (FIG. 1) which can either be in direct communication with conduit 141 or can be introduced thereinto after passing through injector 16. Utilizing this arrangement, the clarified water provides all or part of the supply of water to be decomposed within the cell 115. This is a convenient arrangement, particularly if the clarified wastewater has qualities that are particularly advantageous for use within the specific cell 115.

It is also within the scope of this embodiment that the water to be decomposed by the electrodes 121 is replenished by wastewater flowing into the cell 115 through tank 114. However, when conduit 141 is provided, the fluid enters the cell 115 through one or more openings 142, which may be either a plurality of orifices or an elongated slot. In either event, each opening 142 is preferably directed at angles so as to provide relatively uniform distribution of the aqueous fluid below the electrodes 121. For example, effective distribution is found to occur if angle A (FIG. 4) is on the order of 75°.

A further optional feature of this embodiment is flushing conduit 143, which is provided to facilitate cleaning of the tank 114 and the cell 115, whereby any waste products or pollutants that may have accumulated therewithin may be flushed out through said flushing conduit 143.

Generally, the entire top surface of the cell 115 is in communication with the tank 114. Cell 115 and tank 114 are secured to each other by fastening members such as bolts 144 which pass through holes 145 in flange 146 along the upper periphery of the cell 115, the bolts 144 also passing through holes 147 in tank 114. This arrangement is such as to provide a watertight seal between tank 114 and cell 115.

As can be best seen in FIG. 5, the electrodes 121 of this alternate embodiment are generally parallel to each other and alternate electrodes are joined to one of the two electrode connecting members 131 or 131'. When each terminal member 132, 132' is connected to the power source (FIG. 2), the electrodes in contact with one of the connecting members serve as cathodes, while remaining electrodes serve as anodes. Preferably, provision is made for polarity reversal so that the electrodes serving as cathodes can, when desired, be utilized an anodes, and vice versa. As with the preferred embodiment, polarity reversal can be accomplished either manually or through a device such as a reversing switch.

While the preferred embodiment of the cell and tank shown in FIGS. 2 and 3 is particularly well-suited for use with electrodes made of Duriron, both electrodes 21 of that embodiment and electrodes 121 of this alternate embodiment may be made of either the partially soluble variety, such as those made from ferrosilicon alloys, including Duriron, or may be of the insoluble type and made from materials such as palladium-coated titanium, platinized titanium, platinized niobium, platinized tantalum, carbon, graphite, aluminum, platinum, lead-antimony-silver alloys, or ruthenium oxide coated materials. Preferred for utilization in this alternate embodiment as the electrodes 121 are those that display particularly high conductivity and that are of the insoluble type.

Generally, the electrodes of this embodiment are arranged so as to generate particularly high current densities (within the range of about 80 to 150 amps per square foot) at low voltages (on the order of about 10 to 15 volts). Such is accomplished by providing electrodes that are rectangular in cross-section, are relatively thin, are oriented such that the width thereof is substantially vertical, and are closely spaced with respect to each other. More particularly, the electrodes 121 have a thickness dimension "T" on the order of from about ⅛ to ¼ inch (approximately 0.317 to 0.635 cm.), a width or vertical dimension "W" in the range of about ½ inch (about 1.27 cm.) up to several inches, and any convenient length, depending upon the size of the cell 115, a generally suitable length being on the order of about two feet (approximately 60 cm.) up to several feet.

Theoretically, the electrodes 121 should be as close together as possible to accomplish the especially high densities featured by this embodiment. Spacings of less than one inch are generally required. Optimum spacing has been found to be within the range of about 1/16 to ¼ inch (approximately 0.159 to 0.635 cm.). Spacings smaller than 1/16 inch have the disadvantage of clogging too easily. An especially suitable distance has been found to be 3/16 inch (approximately 0.47 cm.). This spacing, while it is exceptionally close for this art is made practicable primarily due to the following.

In the present apparatus, the industrial wastewater flows through tank 114; that is, it flows above and not through the cell 115. Also in the preferred structure of this alternate embodiment, a separate supply of water for decomposition into the gas bubbles enters cell 115 from below the electrodes 121 thru the conduit 141. Consequently, substantially all of the impurities within the wastewater remain above the cell 115 and electrodes 121 therein, thereby eliminating any appreciable flow of impurities through the electrodes 121 themselves, between which impurities would otherwise be trapped.

Figure 6:
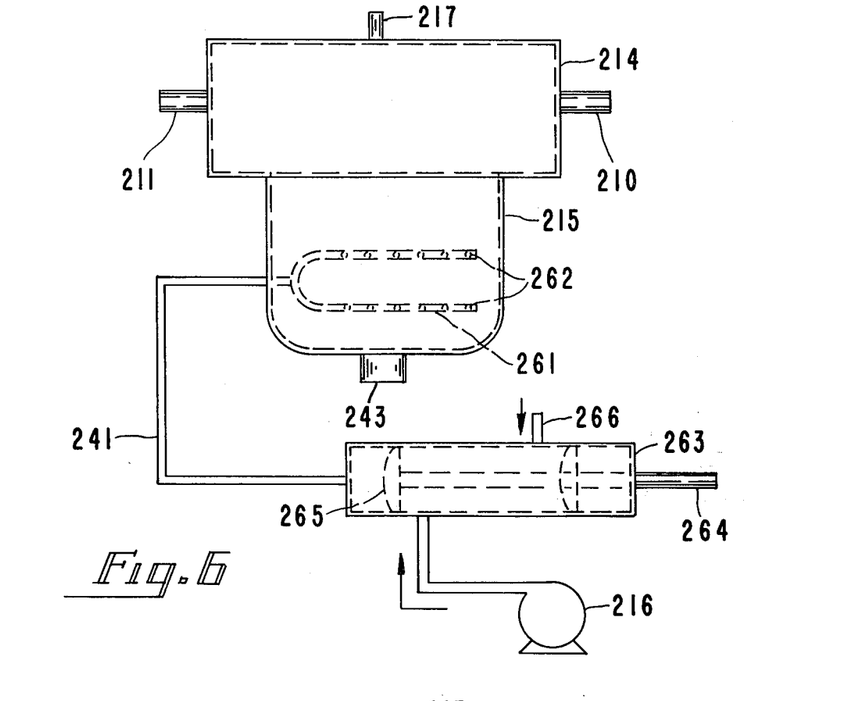
FIG. 6 is an elevation view of another alternate embodiment of the portion of the apparatus shown in FIGS. 2 and 3.
Figure 7:
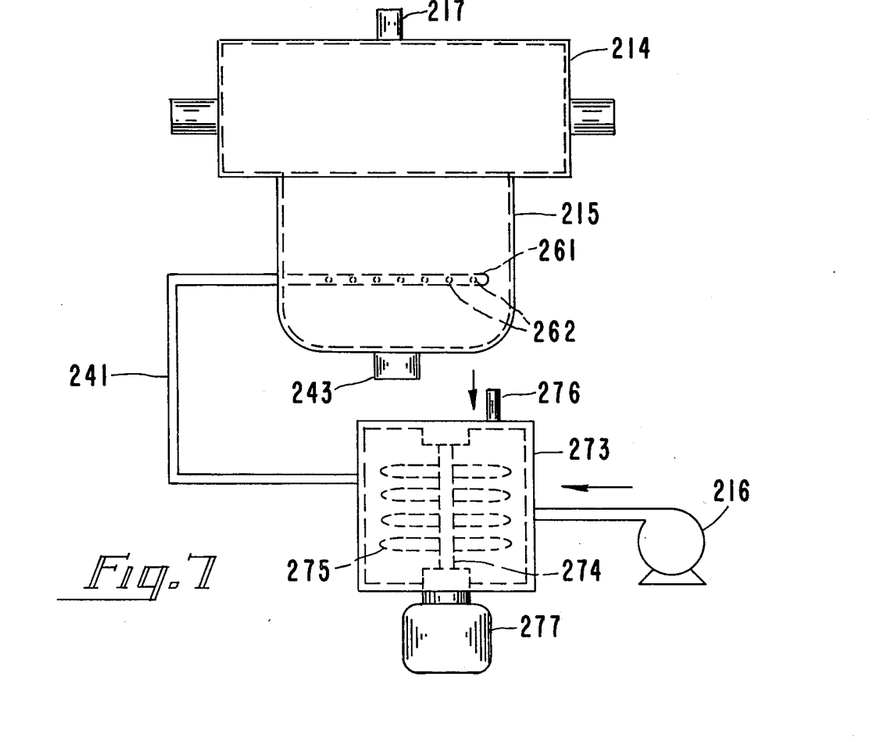
FIG. 7 is an elevation view of yet a further alternate embodiment of the portion of the apparatus shown in FIGS. 2 and 3.

FIGS. 6 and 7 relate to two further alternate embodiments of the bubble introduction means 20, neither of which utilizes means to supply the bubbles by electrolytic decomposition of water as do the preferred embodiment and the alternate embodiment of FIGS. 4 and 5. Instead, gas bubbles are supplied within a water source introduced into the cell 215. Similar to the preferred embodiment and the other alternate embodiment previously described it is essential that such gas bubbles, which may be air or another gas, rise within cell 215 and enter tank 214 from below the stream of water flowing through tank 214 which is in watertight communication with the top portion of cell 215. As with the other embodiments, such gas bubbles form aggregates of bubbles and pollutants, said pollutants having been within the stream of wastewater entering said tank 214 through influx conduit 211, and said aggregates and wastewater flow out of tank 214 through transfer conduit 210. As with the other embodiments, a gas escape tube 217 is provided in tank 214.

Referring particularly to the alternate embodiment of FIG. 6, a supply of gas dissolved in water is provided which is introduced into cell 215 by means of a plurality of connected conduits 261 positioned within the cell 215, each conduit having a plurality of orifices 262 to permit the dissolved gas bubbles to rise within cell 215 and to form the dense zone of fine bubbles. The supply of gas dissolved in water is prepared within compression means 263, which is generally a cylinder having a rod 264 and a piston 265 slidably positioned therein. Aqueous fluid is supplied into compression means 263 by aqueous fluid injector 216. As with the aqueous fluid injector 16 of the other embodiments, injector 216 may have either its own separate source of fluid (not shown) or be in communication with conduit 25 (FIG. 1) and thereby be fed with water clarified in the present apparatus. In communication with compression means 263 is a gas inlet member 266, which may be either simply open to atmosphere or may be in communication with a gas supply means (not shown). When rod 264 and hence piston 265 are drawn back within compression means 263, aqueous fluid and gas enter therein and are compressed upon the return stroke of piston 265 to thereby dissolve gas bubbles within the aqueous fluid. The dissolved bubbles in the fluid pass into cell 215 by means of fluid distribution conduit 241. Surfactant may also be introduced through conduit 241, if desired. A means for flushing out impurities accumulated within cell 215 is provided by flushing conduit 243.

The other alternate embodiment, represented by FIG. 7, is similar to that of FIG. 6, also including a plurality of connected conduits 261 with orifices 262. This embodiment, however, includes a blending means 273 for dispersing gas bubbles in aqueous fluid instead of the compression means 263 for dissolving gas bubbles in aqueous fluid. The blending means 273 has a plurality of mixing blades 275 mounted along a shaft member 274 which is rotatably mounted within blending means 273. Shaft member 274 is connected to motor means 277 for rotating the mixing blades 275. Water is supplied into blending means 273 by injector 216. As is the case for the other embodiments, injector 216 may have its own supply of aqueous fluid (not shown) or may be fed through conduit 25 (FIG. 1) with water clarified by the present apparatus. The blending means 273 is supplied with a gas through gas inlet member 276, which may be open to the atmosphere or in communication with a supply of gas (not shown). Through the rotation of the mixing blades 275, gases entering the blending means 273 through inlet member 276 are dispersed throughout the aqueous fluid, after which the aqueous fluid with gas dispersed therein passes through fluid distribution conduit 241 and into cell 215. Such dispersed air supplies the bubbles necessary to form the dense zone of bubbles within tank 214.

Figure 8:
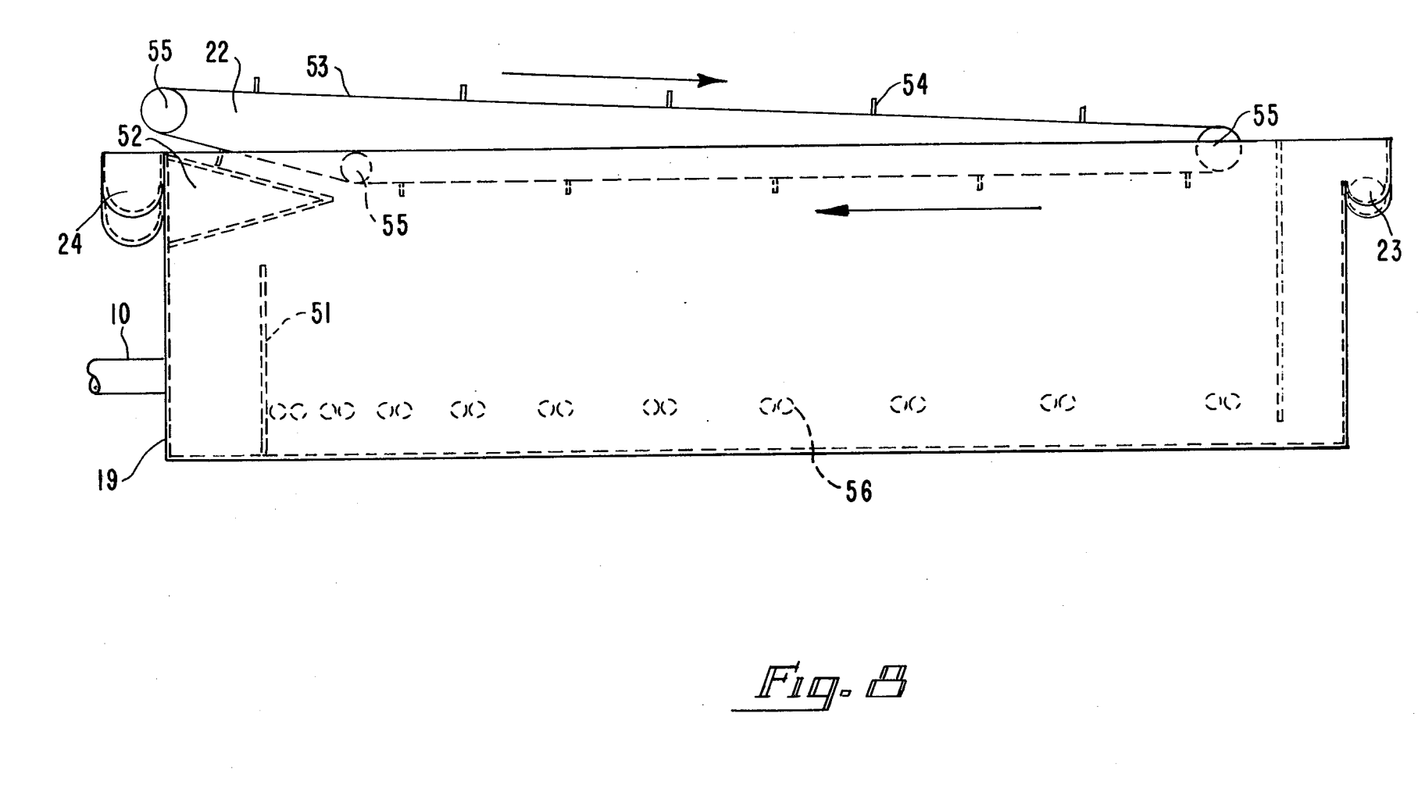
FIG. 8 is an elevation view of the preferred flotation basin, as well as of a further, optional embodiment of the flotation basin.

FIG. 8 shows in more detail the structure of the flotation basin 19 in accordance with the preferred embodiment of the present apparatus. The previously treated wastewater flows into the basin 19 through transfer conduit 10. The flow thereof is directed generally upwardly within the flotation basin 19 by vertical baffle member 51. The wastewater flow is further directed in a downstream direction by triangular baffle member 52. The aggregates of bubbles and pollutants or the full floc within the treated wastewater rises to the surface of the wastewater within the basin 19, whereupon it comes into contact with skimming means 22. Skimming means 22 preferably consists of a conveyor means 53 having a plurality of skimming elements 54. The conveyor means 53 travels around a plurality of roller members 55 such that the undersurface thereof travels through basin 19 in a direction opposite to that of the general flow of the wastewater within the basin. Skimming elements 54 then come into contact with the aggregates or the full floc at the top surface and direct it out of the basin 19 and through skimmings efflux conduit 24.

An optional, additional feature of the flotation basin 19 is also shown in FIG. 8. Generally, this optional feature is any means that will provide a supply of bubbles originating from near the bottom surface of the flotation basin 19. It is emphasized that this optional structure is provided merely to assist in the flotation of the full floc or aggregates within basin 19 so that they may be more readily skimmed off. It is not provided for the purpose of forming the full floc or aggregates. In the particular structure shown in FIG. 8, a pluralilty of rod-shaped Duriron electrodes 56 are provided within flotation basin 19. As depicted in FIG. 8, these electrodes are provided in anode-cathode pairs, the polarity of which may be periodically reversed. Again in accordance with the particular structure that is shown in FIG. 8, these electrode pairs are spaced unevenly from each other. This arrangement permits the generation of a greater quantity of bubbles at locations where the aggregates or the full floc is thickest, which is along that portion of the basin 19 where the treated wastewater enters.

The following examples are set forth as illustrative embodiments of the method and are not to be taken in any manner as limiting the scope of the invention which is defined by the appended claims.

EXAMPLE I

An industrial installation at a beef slaughtering plant processed wastewater at a rate of 2,270 liters per minute. First added was 350 mg/liter of ferric sulfate as a coagulant. Thereafter, 80 mg/liter of calcium hydroxide was added to adjust the pH. Then, the wastewater was allowed to enter a tank in accordance with the preferred apparatus as described herein. In this particular apparatus, the cell contained electrodes made from a ferrosilicon alloy (Duriron), there being 70 rod electrodes having a circular cross-section of either 1½ inches or 2 inches in diameter and a length of about 5 feet. The electrodes were suspended within a cell having a square cross-section by means of wooden hangers positioned near the top of the electrodes. The conductivity generated in this example was on the order of 700 micromohs per centimeter and 500 amperes of current flowed when applied by a 12 volt DC power source. Satisfactory results were obtained. It was observed that even better results were obtained and the current flow was substantially increased to about 1500 amperes, while still utilizing a 12 volt source, by introducing approximately 1.9 liters per minute of 20 weight percent sulfuric acid as an ionic species introduced below the electrodes. Characteristics of the raw wastewater were 1215 mg/liter BOD (biochemical oxygen demand), 850 mg/liter total suspended solids, and 610 mg/liter hexane extractables, while those of the treated wastewater were 95 mg/liter BOD, 88 mg/liter total suspended solids, and 15 mg/liter hexane extractables.

EXAMPLE II

To approximately 100 cc of tannery wastewater having approximately 1,300 mg/liter BOD and 456 mg/liter hexane extractables were added 1,200 mg/liter of ferric sulfate, followed by 800 mg/liter calcium hydroxide. Electrodes in the cell were rod-shaped, having a diameter of ⅛ inch and constructed of platinized titanium, with the spacing therebetween being about ¼ inch. Upon the application of 12 volts, 144 amperes per square foot of electrode surface were generated. This current was permitted to flow for 15 seconds, after which time essentially 100 percent of the impurities were combined with bubbles generated by water decomposition within the cell to form an embryo floc. Then, 2 mg/liter of polyelectrolyte was added, accompanied by mild agitation, to form a full floc which rapidly rose to the surface, with the aqueous phase being substantially completely clarified, the treated wastewater having an analysis on the order of that of Example I.

EXAMPLE III

Example II was essentially repeated except that this time a surfactant was added after the calcium hydroxide. It was found that essentially the same results were achieved as in Example II, except that this time the virtually complete clarification was obtained after the current flowed for only 10 seconds. This example illustrates the increased efficiency obtainable by the use of a surfactant in the present apparatus, the energy requirements having been reduced by roughly 30 percent.

EXAMPLE IV

This example was carried out in the apparatus of the present invention, using the alternative electrode embodiment of FIGS. 4 and 5. The electrodes were of platinized titanium, spaced 3/16 inch (about 0.47 cm.) apart, and each had a surface area of 5 square feet (about 0.5 sq. meter). A flow of 250 gallons per minute (approximately 945 liters per minute) of meat processing wastewater was treated with 300 mg/liter ferric sulfate. A current of 500 amperes in toto was generated by a 12 volt DC power source. Fed into the apparatus below the electrodes was a surfactant pumped in at a rate of 5 gallons per minute (approximately 19 liters per minute). The surfactant was non-ionic, a solution of nonylphenylpolyethylene glycol ether having a concentration of 0.1 weight percent. The untreated wastewater was analyzed as 1,600 mg/liter BOD (biochemical oxygen demand); 800 mg/liter SS (total suspended solids); and 850 mg/liter hexane extractables. After clarification by the present apparatus and method, the analysis was 110 mg/liter BOD; 80 mg/liter SS; and 20 mg/liter hexane extractables.

Obviously, many modifications and variations of the invention as hereinbefore set forth may be made without departing from the spirit and scope thereof, and only such limitations should be imposed as are indicated in the appended claims.

We claim:

1. A method for removing pollutants from raw wastewater comprising steps of: introducing a flow of wastewater into a compact and dense zone of fine bubbles originating from a bubble supply below said zone, substantially all of the pollutants within the wastewater remaining above said bubble supply at all times; churning said pollutants with said bubbles while said wastewater remains within said zone whereby said fine bubbles are rapidly contacted with said pollutants to form aggregates of bubbles and pollutants, said aggregates remaining unseparated from said wastewater flow; flowing substantially all of said wastewater flow, together with said unseparated aggregates, out of said zone; introducing said aggregates and wastewater into a flotation basin to permit the aggregates to rise to the surface of the wastewater; and separating the aggregates from the remainder of the wastewater, which has thus been substantially clarified of pollutants.

2. The method of claim 1, wherein said step of rapidly forming the aggregates of bubbles and pollutants is assisted by moderate turbulence developed between the flowing wastewater which is initially substantially horizontal as it passes into said dense zone of fine bubbles, which bubbles enter the zone from the bubble supply with an initial orientation that is substantially vertical.

3. The method of claim 1, wherein said bubble supply is produced in the presence of a surfactant to consistently maintain said fine bubbles within an expecially small range of diameter sizes.

4. The method of claim 3, wherein said bubble supply is produced by electrolytic decomposition of water within a bubble supply cell and said surfactant is added in an amount of about 0.0001 to 0.1 percent by weight of the water within the cell.

5. The method of claim 1, wherein said dense zone of fine bubbles is produced electrolytically by a current flow of about 0.5 to 50 ampere minutes per gallon of wastewater, said dense zone of fine bubbles fills approximately 0.1 to 10 volume percent of electrolytically produced bubbles within the volume of wastewater being treated in said zone, said dense zone of fine bubbles contains about $10^4$ to $10^{10}$ bubbles per liter of wastewater, and said fine bubbles are within the range of about 10 to about 500 microns in diameter.

6. The method of claim 5, wherein said current flow is about 1.5 to 8 ampere minutes per gallon of wastewater, said amount of electrolytically produced bubbles is approximately 0.3 to 2 volume percent, said dense zone of bubble contains about $10^6$ to $10^9$ bubbles per liter, and said diameter of the fine bubbles is within the approximate range of about 10 to 100 microns.

7. The method of claim 1, wherein said step of rapidly forming aggregates of bubbles and pollutants is accomplished in about 6 seconds to about 2 minutes.

8. The method of claim 1, wherein said aggregates of bubbles and pollutants comprise an embryo floc, said method further comprising the step of adding a flocculant to said embryo floc to form a full floc, said full floc being those aggregates of bubbles and pollutants that are then introduced into the flotation basin.

9. The method of claim 8, wherein said flocculant is a polyelectrolyte that is added at a concentration within the approximate range of about ½ to 15 ppm.

10. The method of claim 8, wherein said full floc has a density within a range of about 0.7 to about 0.9.

11. The method of claim 1, wherein said separating step is accomplished by skimming.

12. The method of claim 1, wherein said separation step is assisted by supplying gas bubbles originating near the bottom surface of said flotation basin.

13. The method of claim 1, wherein said wastewater is a meat processing wastewater.

14. A method for removing pollutants from raw wastewater comprising steps of: flowing a wastewater into a compact and dense zone of fine bubbles originating from a bubble supply below said zone, substantially all of the pollutants within the wastewater remaining above said bubble supply at all times, said bubble supply being provided by electrolytically decomposing an aqueous fluid that is introduced below said bubble supply; churning said pollutants with said bubbles while said wastewater remains within said zone whereby said fine bubbles are rapidly contacted with said pollutants to form aggregates of bubbles and pollutants; flowing said aggregates and wastewater out of said zone; introducing said aggregates and wastewater into a flotation basin to permit the aggregates to rise to the surface of the wastewater; and separating the aggregates from the remainder of the wastewater, which has thus been substantially clarified of pollutants.

15. The method of claim 14, wherein said aqueous fluid contains an ionic species provided in concentrations within the approximate range of about 0.005 to about 0.05 Normal.

16. The method of claim 15, wherein the ionic species include chloride ions for liberating chlorine as a disinfecting agent.

17. An apparatus for removing pollutants from raw wastewater comprising: a tank for confining an initially horizontal flow of wastewater, said tank being substantially free of obstructions, a cell having therein a bubble introduction means for providing fine bubbles, said cell being located below and in communcation with said tank, whereby pollutants within said wastewater combine with said bubbles within said tank to form aggregates of pollutants and bubbles, said aggregates remaining unseparated from said wastewater flow; a wastewater influx conduit; a treated wastewater transfer conduit for removing substantially all of said treated wastewater flow and said unseparated aggregates together from said tank, each conduit being in communication with said tank; and a flotation basin in communication with said transfer conduit, said flotation basin being for separating said aggregates of pollutants and bubbles from the thus clarified wastewater.

18. The apparatus of claim 17, wherein the influx conduit includes a coagulant injector.

19. The apparatus of claim 17, wherein the influx conduit includes an injector for introducing a compound to adjust the pH of the wastewater.

20. The apparatus of claim 17, wherein an aqueous fluid injector is in communication with said cell for adding an aqueous fluid thereinto.

21. The apparatus of claim 17, wherein the transfer conduit includes a flocculant injector.

22. The apparatus of claim 17, wherein the bubble introduction means includes a plurality of electrodes positioned therein, said electrodes being connected to a power source, said cell being supplied with an aqueous fluid, whereby current flowing through said electrodes decomposes said aqueous fluid to produce said fine bubbles.

23. The apparatus of claim 22, wherein said electrodes are constructed of a metal selected from the group consisting of ferrosilicon alloys, carbon, graphite, aluminum, lead-antimony-silver alloys, platinum, palladium-coated titanium, platinized titanium, platinized niobium, platinized tantalum, and ruthenium oxide coated metals, said eleectrodes being substantially parallel to each other spaced apart at a distance within the range of about 1/16 inch to 2 inches.

24. The apparatus of claim 22, wherein said electrodes are ferrosilicon alloy rods positioned substantially parallel to each other, spacing between the electrodes being from about ½ inch to 2 inches, the tank having a horizontal cross-section that is substantially circular, and the influx conduit being spaced along the vertical dimension of the tank at a height less than the height at which the transfer conduit is in communication with the tank.

25. The apparatus of claim 22, wherein said electrodes are constructed of a precious metal, are bar-shaped, and are alternately connected to one of two electrode connecting members positioned on opposite ends of the lengths of said electrodes so as to form two fork-shaped electrode units oriented in opposite directions, with electrodes from one fork-shaped electrode unit alternating with and being spaced between and substantially parallel to electrodes from the other fork-shaped electrode unit, said spacing being within the approximate range of about 1/16 inch to 1 inch.

26. The apparatus of claim 25, wherein said distance is within the range of from about 1/16 inch to about ¼ inch.

27. The apparatus of claim 17, wherein said bubble introduction means comprises a compression means for dissolving a gas within an aqueous liquid;

said compression means including a rod and a piston slidably positioned therein, a gas inlet member in communication therewith, and a means for introducing an aqueous fluid into said compression means; and said compression means being in communication with said cell whereby the gas dissolved within the aqueous fluid is introduced into the cell to thereby generate said fine bubbles.

28. The apparatus of claim 17, wherein said bubble introduction means comprises a blending means for dispersing a gas within an aqueous fluid;

said blending means including a plurality of mixing blades rotatably mounted therein, a means for rotatably driving said blades, a gas inlet member in communication with the blending means, and a means for introducing an aqueous fluid into said blending means; and said blending means being in communication with said cell whereby the gas dispersed within the aqueous fluid is introduced into the cell to thereby generate said fine bubbles.

29. The apparatus of claim 17, wherein said wastewater is a meat processing wastewater.

30. An apparatus for rapidly mixing very fine bubbles with a flow of raw wastewater, comprising a tank for confining an initially horizontal flow of wastewater, said tank being substantially free of obstructions, said tank being positioned above and in communication with a cell containing a plurality of electrodes for connection to a source of power, said cell being supplied with an aqueous fluid whereby current flowing through said electrodes decomposes said aqueous fluid to produce a dense, initially vertical stream of fine bubbles, whereby said initially horizontal flow of wastewater rapidly and moderately turbulently contacts said initial vertical stream of fine bubbles to form aggregates of pollutants and bubbles, said aggregates remaining unseparated from said wastewater flow, and a treated wastewater fransfer conduit in communication with said tank for removing substantially all of said treated wastewater flow and said unseparated aggregates together from said tank.

31. The appaaratus of claim 30, wherein said electrodes are bar-shaped and alternately connected to one of two electrode connecting members positioned on opposite ends of the lengths of said electrodes so as to form two fork-shaped electrode units oriented in opposite directions, with electrodes from one fork-shaped electrode unit alternating with and being spaced between and substantially parallel to electrodes from the other fork-shaped electrode unit, said spacing being within the approximate range of about 1/16 inch to 1 inch.

32. The apparatus of claim 31, wherein said wastewater is a meat processing wastewater.

33. The apparatus of claim 30 wherein said wastewater is a meat processing wastewater.

* * * * *